(12) United States Patent
Kawata et al.

(10) Patent No.: US 10,035,710 B2
(45) Date of Patent: Jul. 31, 2018

(54) METHOD FOR PRODUCING LITHIUM CARBONATE

(71) Applicants: Masanobu Kawata, Tokyo (JP); Kohei Mitsuhashi, Tokyo (JP); Akemitsu Iida, Tokyo (JP); Yutaka Yamaguchi, Tokyo (JP); Atsushi Moriya, Chiba (JP)

(72) Inventors: Masanobu Kawata, Tokyo (JP); Kohei Mitsuhashi, Tokyo (JP); Akemitsu Iida, Tokyo (JP); Yutaka Yamaguchi, Tokyo (JP); Atsushi Moriya, Chiba (JP)

(73) Assignees: NITTETSU MINING CO., LTD., Tokyo (JP); Sumitomo Corporation, Tokyo (JP)

( * ) Notice: Subject to any disclaimer, the term of this patent is extended or adjusted under 35 U.S.C. 154(b) by 0 days.

(21) Appl. No.: 15/334,723

(22) Filed: Oct. 26, 2016

(65) Prior Publication Data
US 2017/0113942 A1  Apr. 27, 2017

(30) Foreign Application Priority Data
Oct. 26, 2015  (JP) .................. 2015-209453

(51) Int. Cl.
*C01D 5/00* (2006.01)
*C01D 15/08* (2006.01)

(52) U.S. Cl.
CPC .................. *C01D 15/08* (2013.01)

(58) Field of Classification Search
CPC ........... C01D 15/08; C01D 7/12; C01B 31/24
See application file for complete search history.

(56) References Cited

U.S. PATENT DOCUMENTS

| 6,592,832 | B1 | 7/2003 | Friedrich et al. | |
| 8,920,763 | B2* | 12/2014 | Tanimura | C01D 15/08 423/419.1 |
| 9,034,294 | B1* | 5/2015 | Harrison | C01D 15/08 423/421 |
| 9,255,011 | B2 | 2/2016 | Kawata et al. | |
| 2012/0237419 | A1 | 9/2012 | Tanimura et al. | |
| 2013/0251610 | A1* | 9/2013 | Kawata | C01D 15/08 423/179.5 |

FOREIGN PATENT DOCUMENTS

| CL | 2002-00098 | 3/2003 |
| CL | 52437 B | 6/2013 |

(Continued)

OTHER PUBLICATIONS

Communication dated Apr. 19, 2017, issued by the Japanese Patent Office in counterpart Japanese Patent Application No. 2015-209453.

(Continued)

*Primary Examiner* — Richard M Rump
(74) *Attorney, Agent, or Firm* — Sughrue Mion, PLLC

(57) ABSTRACT

The present invention provides a method for producing lithium carbonate, that can shorten the time required in the production of lithium carbonate and has excellent maintenance property and production efficiency without forming fixed matters that require complicated procedures to remove in a reaction apparatus.

6 Claims, 3 Drawing Sheets

(56) References Cited

FOREIGN PATENT DOCUMENTS

| | | | |
|---|---|---|---|
| CL | 53829 B | | 6/2013 |
| CN | 1059702 A | | 3/1992 |
| CN | 102168183 A | * | 8/2011 |
| CN | 102432044 A | | 5/2012 |
| CN | 102515212 A | | 6/2012 |
| CN | 103449481 A | | 12/2013 |
| JP | 48-1320 B | | 1/1973 |
| JP | 55-144410 A | | 11/1980 |
| JP | 62-36013 A | | 2/1987 |
| JP | 62-252315 A | | 11/1987 |
| JP | 6-271312 A | | 9/1994 |
| JP | 2002-505248 A | | 2/2002 |
| JP | 2012-116681 A | | 6/2012 |
| JP | 2013-193940 A | | 9/2013 |
| JP | 5406822 B2 | | 2/2014 |
| JP | 5406955 B2 | | 2/2014 |

OTHER PUBLICATIONS

Murakami, H., "Lithium Resources", GSJ Chishitsu News, Jun. 2010, Issue No. 670, 8 pages total.
Kanai, Y., "Production and Use of Lithium from Salar de Atakama", GSJ Chishitsu News, Jun. 2010, Issue No. 670, 7 pages total.
Office Action dated Mar. 16, 2018 by the Chilean Patent Office in counterpart Chilean Patent Application No. 2016-2017.
Anonymous, "Encyclopedia Chimica 5", Reduced edition, 1979, 2 pages total.
Anonymous, "Encyclopedia Chimica 5", Reduced edition, 1979, 1 page total.

* cited by examiner

METHOD FOR PRODUCING LITHIUM CARBONATE

FIELD OF THE INVENTION

The present invention relates to a method for producing lithium carbonate particularly useful as a raw material of an electronic material and an optical industrial material.

In more detail, the present invention relates to a method for producing lithium carbonate, that efficiently manufactures high purity lithium carbonate having a purity particularly usable as a lithium battery material, from a brine containing lithium carbonate. More specifically, the present invention relates to a method for producing lithium carbonate, that does not deposit fixed matters leading to suspension of operations of a carbonation reaction apparatus in a carbonation reaction, can shorten the manufacturing time, and has excellent maintenance property and production efficiency.

BACKGROUND OF THE INVENTION

Lithium carbonate is widely and variously used as, for example, a compounding ingredient of a heat-resistant glass or an optical glass, a ceramic material, a raw material of a lithium secondary battery used in a battery of a mobile phone or a laptop personal computer, a material of an electrolyte, and a raw material of lithium niobate single crystal or lithium tantalite single crystal used in semiconductive laser. For those uses, properties (characteristics) required in the lithium carbonate are of great variety, and vary depending on the purpose of use.

For example, when the lithium carbonate is used as the electronic material or optical industrial material, if the lithium carbonate contains a large amount of impurities, electric properties and optical properties are deteriorated. For this reason, high purity lithium carbonate containing less impurities is required. Lithium carbonate having a purity of 97% or more, preferably 98% or more, more preferably 99% or more and still more preferably 99.5% or more is required as the material of a lithium secondary battery.

Furthermore, high purity lithium carbonate having the content of different metals and other impurities in a level of several ppm, particularly 1 ppm or less, may be required depending on the purpose of use.

The lithium carbonate is produced from lithium resources that naturally exist, and examples of resources in which lithium exists in a large amount with high concentration include lithium deposits and brines in intercontinental salt lakes. In the present circumstances, lithium is mainly produced using brines in intercontinental salt lakes (see Non-Patent Documents 1 and 2).

In connection with the production of lithium carbonate from the brines, a lithium battery is in the spotlight as a drive power source with the progress of the development of electric vehicles, and brine as a lithium source is again noticed as a supply source in mass consumption of lithium carbonate (see Non-Patent Documents 1 and 2).

Salt lakes from which the brine is obtained are located on a limited area such as People's Republic of China, United States of America, Chile, Argentina and Bolivia, and are unevenly distributed.

Particularly, lithium deposits in the salt lakes in the area of the Andes, such as Chile (Salar de Atacama), Argentina (Salar del Hombre Muerto) and Bolivia (Salar de Uyuni) are far better (see Non-Patent Document 1). In fact, a large amount of lithium carbonate is produced using the brines in these areas as a lithium raw material (see Non-Patent Document 2).

The lithium (Li) concentration in the brines of salt lakes in the Andes is from about 0.05 to 0.3 wt %, and after concentrating the brines to a concentration of about 6 wt % by the sunlight, the concentrated brines are used in the production of the lithium carbonate. In such a case, lithium in the form of lithium chloride is used in the production of the lithium carbonate.

The brines contain sodium, potassium, magnesium and the like in high concentration, other than lithium. It is necessary to separate and remove those components in order to produce high purity lithium carbonate, and even in the conventional technologies, those components are separated before or after a carbonation reaction.

The lithium carbonate is required to have high purity as described above, and lithium carbonate having an impurity content of 1 ppm or less is sometimes required as described above.

Examples of a method for producing such high purity lithium carbonate include a method of conducting microfiltration of an aqueous solution containing lithium bicarbonate obtained by reacting crude lithium carbonate with carbon dioxide, and then heat-treating the aqueous solution containing the lithium bicarbonate to deposit lithium carbonate (see Patent Document 1) and a method of treating an aqueous solution containing lithium bicarbonate obtained by reacting crude lithium carbonate with carbon dioxide, with an ion-exchange module, and then heat-treating the aqueous solution containing the lithium bicarbonate to deposit lithium carbonate (see Patent Document 2).

In producing the lithium carbonate, lithium chloride in brine as a lithium resource and sodium carbonate as a raw material of a carbonation reaction are generally used. For this reason, sodium carbonate corresponding to the amount of lithium chloride used that is a raw material of lithium is required in the production.

As a result, in order to produce the lithium carbonate, it is necessary to transport sodium carbonate to the Andes highland exceeding 3,000 meters above sea level, that is the actual place at which lithium chloride brine is produced, or to transport concentrated brine to the place at which a reaction raw material such as sodium carbonate is easily available. In any case, the transportation cost of those greatly affects the production cost of lithium carbonate. When the concentrated brine is transported as in the latter, transportation amount is far increased as compared with the case of transporting sodium carbonate, and the cost is further increased.

As a result of earnest investigations on the above-described problems, the present inventors succeeded the development of a method for producing high purity lithium carbonate that reduced production costs, thereby solving the problems, already filed a patent application, and obtained a patent (see Patent Document 3).

In the production method, it was succeeded to reduce transportation costs by using local resources as much as possible and reusing substances by-produced in a carbonation step, without transporting sodium carbonate to the periphery of salt lakes in the Andes. Specifically, the method is to conduct a carbonation reaction of lithium-containing brine using carbon dioxide gas and ammonia, and it was succeeded to supply both raw materials at the actual place at which lithium chloride brine is produced, by using limestone as a raw material of carbon dioxide gas and a by-product as a raw material of ammonia.

The production method is specifically described below. Namely, the production method includes: mixing ammonia and carbon dioxide gas (carbonate gas) with an aqueous solution containing lithium chloride to conduct a carbonation reaction; and recovering a solid formed after the reaction through solid-liquid separation, in which, as the carbon dioxide gas, a product obtained by thermally decomposing limestone at the actual place at which a carbonation reaction is conducted is used, and, as the ammonia, a product produced by reacting ammonium chloride by-produced in the production of lithium carbonate with quicklime by-produced in the production of carbon dioxide gas or slaked lime obtained by hydrating the quicklime, is used.

Patent Document 1: JP-A-62-252315
Patent Document 2: JP-T-2002-505248
Patent Document 3: Japanese Patent No. 5406822 (JP-A-2012-116681)
Patent Document 4: Japanese Patent No. 5406955 (JP-A-2013-193940)
Non-Patent Document 1: GSJ Chishitsu News No. 670, pages 22 to 26, "Lithium Resources"
Non-Patent Document 2: GSJ Chishitu News No. 670, pages 49 to 52, "Production of Lithium from Salar de Atacama, Chile, and Use of Lithium Compounds"

SUMMARY OF THE INVENTION

In order to put this method into practical use, the present inventors decided to advance earnest investigations from many sides, and first started to investigate a carbonation reaction in which lithium chloride brine that is an aqueous solution containing lithium chloride, ammonia and carbon dioxide gas (carbonate gas) are mixed.

The carbonation reaction is a gas-liquid contact reaction that reacts carbon dioxide gas as a gas, ammonia as a gas or ammonia as a liquid, and lithium chloride brine as a liquid with each other. Therefore, in order to increase absorption of carbon dioxide gas in an aqueous solution and reaction efficiency of carbonation of lithium, a production reaction of lithium carbonate was carried out using a reaction tower having a plurality of trays each equipped with a bubble cap arranged on an opening thereof.

As a result, it became clear that fixed matters are deposited on every place in the reaction tower such as an inner wall of the reaction tower, an opening of a tray, a bubble cap and a downcomer, and it became also clear that the fixed matters are a part of lithium carbonate that is an objective substance to be produced. Furthermore, it became clear that the fixed amount increases with a reaction time, and when a reaction is continued for about two days and nights, the fixed amount is an amount to an extent that carbon dioxide gas becomes impossible to pass through an opening of a bubble cap, an opening of a tray, an opening of a downcomer, and the like in a reaction tower, that is, an amount to an extent that a carbonation reaction apparatus lead to suspension of operations. Furthermore, it became clear that time to the same extent as a reaction time is required to clean and remove the fixed matters, and it is still difficult to completely remove the fixed matters. From those, this method was not satisfactory in maintenance property and production efficiency.

In view of the above, the present invention has a problem to be solved to provide a production method having excellent maintenance property and production efficiency in producing lithium carbonate without forming the fixed matters in a carbonation reaction apparatus, and the present inventors made earnest investigations from each side on the problem.

Patent Document 3 developed by the present inventors discloses two embodiments regarding mixing of lithium chloride brine, ammonia and carbon dioxide gas (carbonate gas), and one is performed by simultaneously mixing those materials, and the other is performed by adding ammonia to the aqueous solution and then adding carbon dioxide gas thereto. Patent Document 3 indicates that the latter is preferred.

However, formation of fixed matters in a reaction apparatus could not be avoided in any of those mixing procedures. Further investigations were made on the carbonation reaction from this fact. As a result, the present inventors were aware that in any of those procedures, both carbon dioxide gas and lithium chloride brine are introduced in the reaction apparatus, and the fixed matters are formed on an inner wall of a reaction tower, an upper surface of a tray, an opening of a tray, a downcomer and the like in the reaction apparatus through which lithium chloride brine passes, in the co-presence of those materials. In other words, they were aware that the fixed matters are formed on the surface in a reaction apparatus structure with which lithium chloride brine contacts, in the co-presence of carbon dioxide gas and lithium chloride brine.

In view of the above, the present inventors presumed that the formation of the fixed matters can be avoided by employing a reaction that does not introduce carbon dioxide gas during the formation of lithium carbonate. Specifically, they presumed that the formation of the fixed matters can be avoided by separating the reaction into carbonation of lithium chloride brine and introduction (absorption) of carbon dioxide gas. Earnest investigations were made on a reaction that enables this presumption. As a result, they reached a production method making it possible to produce lithium carbonate by mixing water, ammonia and carbon dioxide gas to form an ammonium carbonate aqueous solution, and mixing the ammonium carbonate aqueous solution with lithium chloride brine. Furthermore, they could confirm that the fixed matters are not formed in the reaction apparatus by this two-stage reaction.

It has been also found in the present invention that formation reaction of ammonium carbonate, that is, carbonation reaction of ammonia, and carbonation reaction of lithium chloride are conducted in a two-stage reaction, thereby smoothly proceeding the formation reaction of lithium carbonate, and as a result, the time required in the production of lithium carbonate can be shortened and production efficiency can be improved. Thus, in contrast to the reaction of Patent Document 3, the present invention employs a two-stage reaction of reacting ammonia with carbon dioxide gas in water to form ammonium carbonate, and then reacting the ammonium carbonate with lithium chloride, and has the aim that the two-stage reaction is smoothly proceeded to produce lithium carbonate in a short period of time.

The problem to be solved by the present invention has been described before, but is again described as follows.

An object of the present invention is to provide a method for producing lithium carbonate, that can shorten the time required in the production of lithium carbonate and has excellent maintenance property and production efficiency, by separating a reaction into carbonation reaction of ammonia and carbonation reaction of lithium chloride to smoothly proceed the formation of lithium carbonate, without forming fixed matters that require complicated procedures to remove and decrease productivity, in a carbonation reaction apparatus.

The method for producing lithium carbonate according to the present invention is described below.

Namely, the method includes: mixing water, ammonia and carbon dioxide gas (carbonate gas) to form an ammonium carbonate aqueous solution (hereinafter sometimes referred to as an "ammonium carbonate solution"); mixing lithium chloride brine with the ammonium carbonate aqueous solution to conduct a carbonation reaction; and recovering a solid formed after the carbonation reaction through solid-liquid separation, in which, as the carbon dioxide gas, carbon dioxide gas produced by thermally decomposing limestone is used, and as the ammonia, regenerated ammonia obtained by reacting ammonium chloride by-produced during the carbonation reaction with quicklime by-produced during the production of the carbon dioxide gas or slaked lime obtained by hydrating the quicklime (those are sometimes referred to as "quicklime and the like") is used.

The present invention roughly includes two embodiments. A first embodiment is the embodiment described above. In the first embodiment, the entire amount of the ammonium carbonate aqueous solution is mixed with the lithium chloride brine to conduct carbonation reaction.

On the other hand, a second embodiment includes: mixing a part (small amount) divided from the ammonium carbonate aqueous solution with lithium chloride brine to conduct a primary carbonation reaction, thereby depositing only magnesium ions co-present in the brine as magnesium carbonate without depositing lithium carbonate, followed by solid-liquid separation; mixing the residual ammonium carbonate (large amount) with the residual liquid obtained after the solid-liquid separation to conduct a secondary carbonation reaction, thereby depositing lithium carbonate; and recovering the lithium carbonate through solid-liquid separation.

In contrast to the method for producing lithium carbonate described in Patent Document 3, the present invention employs a reaction that does not introduce carbon dioxide gas during the formation of lithium carbonate, and this reaction can avoid the formation of a large amount of fixed matters formed by the production method in a reaction apparatus. In other words, the present invention does not conduct the introduction of carbon dioxide gas during the carbonation reaction of lithium chloride as in the production of lithium carbonate described in Patent Document 3, and this can avoid the formation of fixed matters in a reaction apparatus during the carbonation reaction. For this reason, the present invention can provide a method for producing lithium carbonate, that can avoid the situation leading a carbonation reaction apparatus to suspension of operations as in the method for producing lithium carbonate described in Patent Document 3, and has excellent maintenance property and production efficiency.

Furthermore, the present invention employs a two-stage reaction including carbonation reaction of ammonia and carbonation reaction of lithium chloride, whereby the formation of lithium carbonate smoothly proceeds. As a result, the time required in the production of lithium carbonate can be shortened and production efficiency can be improved.

Specifically, in contrast to the reaction of Patent Document 3, the present invention employs a two-stage reaction including reacting ammonia with carbon dioxide gas in water to form ammonium carbonate and then reacting the ammonium carbonate with lithium chloride. The formation reaction of ammonium carbonate as the first stage is conducted in the absence of lithium chloride, the reaction proceeds smoothly as compared with the reaction of Patent Document 3 of simultaneously reacting three materials, and high purity ammonium carbonate can be produced in a short period of time. Furthermore, the carbonation reaction of lithium chloride as the latter stage is a liquid-liquid reaction, and is completed in very short period of time.

BRIEF DESCRIPTION OF THE DRAWING

FIG. 3 shows an embodiment of an ammonia recovery apparatus including a stripping tower and a decomposition reaction tank, in which an upper part of the tower is a packed tower, a lower part of the tower is a plate tower, ammonium chloride is decomposed by milk of lime in the reaction tank, and its residual liquid is returned to a central part of the tower.

DETAILED DESCRIPTION OF THE INVENTION

The method for producing lithium carbonate according to the present invention includes two embodiments as described above. Therefore, the two embodiments are specifically described based on flow charts shown in FIG. 1 and FIG. 2.

Figure 1:
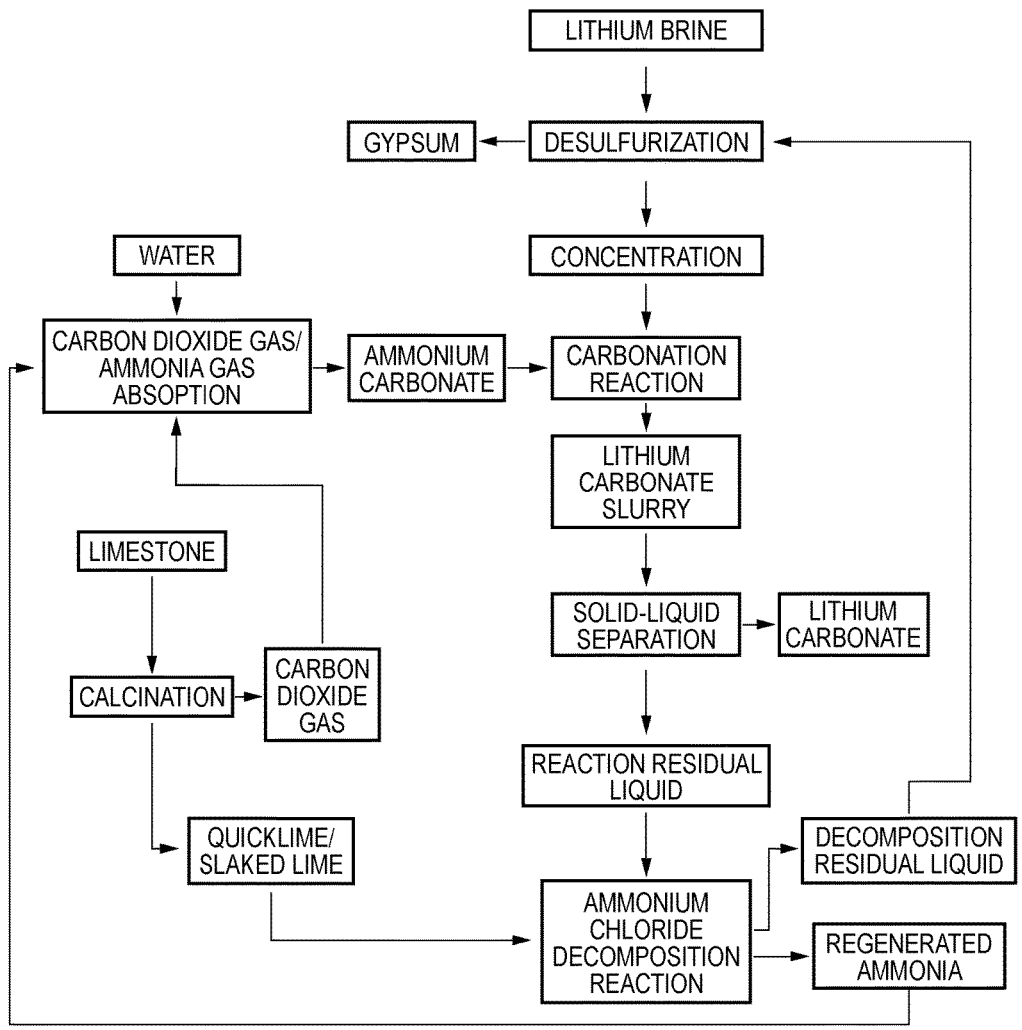
FIG. 1 is a flow chart showing a first embodiment of the present invention.

FIG. 1 is a flow chart of the first embodiment. Both gases, ammonia (gas) recovered and carbon dioxide gas, are absorbed in water in an absorption tower (hereinafter referred to as a "carbon dioxide gas/ammonia gas absorption tower"), and an ammonium carbonate solution is formed.

The ammonium carbonate solution is mixed with lithium chloride brine (concentrated brine) in the carbonation reaction apparatus, and lithium carbonate is formed by the following reaction (1).

$$2LiCl+(NH_4)_2CO_3 \rightarrow Li_2CO_3+2NH_4Cl \qquad (1)$$

The lithium carbonate formed is deposited and is recovered through solid-liquid separation. Simultaneously, ammonium chloride is formed, and is contained in a reaction residual liquid.

In the ammonium carbonate solution, a large amount of ammonia is absorbed in water (solubility to water:water 0° C., 89.9 g/100 ml). Therefore, the ammonia is not converted to ammonium hydroxide by reacting with water, and ammonia as it is, that is, unreacted ammonia, is contained. As a result, ammonia remains in the carbonation reaction residual liquid containing ammonium chloride by-produced (hereinafter simply referred to as a "reaction residual liquid").

Figure 3:
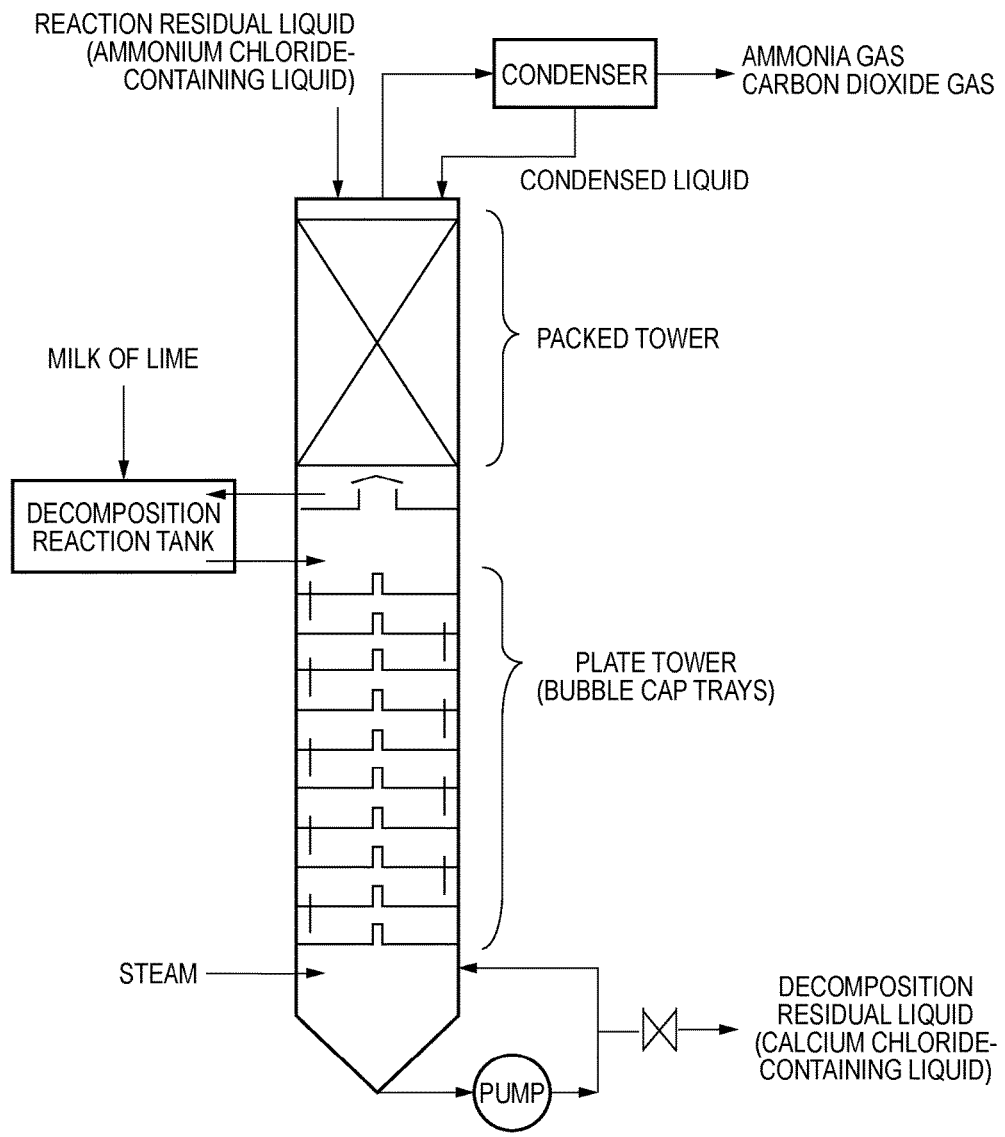
FIG. 3 shows a preferred embodiment of an ammonia recovery apparatus. Specifically.

The ammonia is recovered from the reaction residual liquid containing ammonium chloride by decomposition reaction. It is preferred for the recovery to use an ammonia recovery apparatus that can perform decomposition reaction and diffusing (stripping) treatment (hereinafter simply referred to as a "recovery apparatus"). In other words, it is preferred that the recovery apparatus includes a stripping apparatus (specifically a stripping tower) and a decomposition reaction tank as described in detail below and as shown in FIG. 3. Simultaneously, the residual ammonia is recovered in the recovery apparatus.

In detail, in the recovery apparatus, ammonium chloride formed is decomposed by quicklime that is a by-product during the production of carbon dioxide gas described hereinafter to form ammonia. The ammonia is stripped from a residual liquid remained after the decomposition (hereinafter simply sometimes referred to as a "decomposition residual liquid"), and simultaneously the residual ammonia is also purged from the liquid and recovered. The regenerated ammonia thus recovered is reused as a raw material of the production of ammonium carbonate. Specifically, the regenerated ammonia recovered is absorbed in water, and simultaneously or thereafter carbon dioxide gas is absorbed to produce ammonium carbonate.

In the present invention, the lithium chloride brine that is a raw material of the production of lithium carbonate has preferably a lithium concentration from 2.0 wt % to saturated concentration, more preferably from 4.5 wt % to saturated concentration, and still more preferably from 5.5 wt % to saturated concentration. The lithium chloride brine having such a high concentration can be produced by solar evaporation-concentrating brine of a salt lake containing lithium chloride using an evaporation pond, and this is most reasonable. Examples of the salt lake in which such brine is present include Salar de Atacama (Chile), Salar del Hombre Muerto (Argentina) and Salar de Uyuni (Bolivia) located in the Andes. Needless to say, the concentration of lithium used herein is a concentration as lithium ions, and is not a concentration as lithium chloride.

The brines of salt lakes in the Andes contain lithium in a concentration of from 0.05 to 0.3 wt %, and by solar-concentrating the brines, concentrated brines having a lithium concentration of about 6 wt % are obtained. Those brines are preferred as brines for producing high concentration lithium chloride. In fact, those brines are already used as a raw material for producing high purity lithium carbonate as described before.

The brine for producing high concentration lithium chloride brine is not limited to the above-described brines of salt lakes in the Andes, and any brine can be used so long as it can produce lithium chloride brine having high concentration in the above range by concentration, without particular limitation.

Other than lithium chloride, various impurities are contained in the brines of those salt lakes, and sodium, potassium and the like are contained in concentration far higher than the concentration of lithium. The sodium and potassium partially crystallize and precipitate in a concentration process, and a relative concentration thereof to lithium is decreased after concentration. Other than an alkali metal such as sodium, magnesium, boron and the like are contained in the brine of the salt lake. Those can be removed before carbonation reaction according to the conventional method, and this is described in Non-Patent Document 2 (see page 50, right column). The first embodiment of the present invention can suitably respond to lithium chloride brine having low magnesium concentration after previously removing magnesium. Regarding the removal of magnesium, a novel method is developed in the present invention as described before, and the detail thereof is described in the description of the second embodiment described hereinafter.

It is known that impurities other than the impurities described above are present in brine of a salt lake, and example thereof includes a sulfate radical ($SO_4^{2-}$). It is already known that the sulfate radical is removed by separation before concentration of lithium chloride brine, and this is disclosed in Patent Document 4 indicated by the applicant of the present application.

Even in the first embodiment of the present invention, the sulfate radical can be removed using the decomposition residual liquid remained in the bottom of the recovery apparatus before concentration of lithium chloride brine, and it is preferred to employ this. In detail, a calcium component derived from quicklime used in the decomposition of ammonium chloride remains in the decomposition residual liquid. Gypsum is formed using the calcium component, and the brine can be desulfurized. Furthermore, there is a merit that lithium chloride present in the residual liquid can be recovered by using the decomposition residual liquid for the desulfurization.

Carbon dioxide gas to be introduced in the carbon dioxide gas/ammonia gas absorption tower can be produced by the reaction of the following (2) by calcining limestone that is present in every part of the world and is common resource, and the limestone is also present in the Andes. Therefore, carbon dioxide gas can be supplied in the actual place at which lithium chloride brine is produced, by calcining the limestone.

$$CaCO_3 \rightarrow CaO + CO_2 \tag{2}$$

In other words, carbon dioxide gas can be supplied without carrying from other area, and other production raw materials can be supplied in the actual place. Therefore, it is possible to produce lithium carbonate in the actual place by the present invention.

In such a case, a kiln is arranged in the actual place at which lithium chloride brine is produced, and the calcination is conducted at a temperature of from 800 to 1,500° C. according to the conventional methods. Examples of the calcination furnace include a Beckenbach kiln, a Maerz kiln and a rotary kiln, and the kiln is selected depending on an ambient environment of the actual place and a manufacturing scale.

Water, ammonia and carbon dioxide gas are mixed in the preparation reaction of an ammonium carbonate solution. Those may be mixed by simultaneously introducing in the carbon dioxide gas/ammonia gas absorption tower as shown in FIG. 1. Alternatively, a two-stage reaction may be employed such that water and ammonia are mixed to form ammonia water, and carbon dioxide gas is then introduced therein to form an ammonium carbonate aqueous solution. The latter is desired.

As such ammonia, ammonia obtained by decomposing ammonium chloride by-produced and recovering by stripping is reused.

Gas-liquid contact reaction between water and ammonia and/or carbon dioxide gas is performed in the carbon dioxide gas/ammonia gas absorption tower, and therefore, an apparatus having high gas-liquid contact efficiency is preferably used. Examples of such an apparatus include a bubble tray tower, a bubble cap tray tower, a porous plate tower and a packed tower.

The water used in the carbon dioxide gas/ammonia gas absorption tower may be underground water or water collected from rivers located in the actual place, and as necessary, those waters may be purified. Ion exchange, ultrafiltration, reverse osmosis, adsorption by activated carbon, or the like can be used as a purification method in such a case.

The concentration of the ammonium carbonate aqueous solution used in the carbonation reaction of lithium chloride brine is preferably from 25 wt % to saturated concentration, and more preferably from 40 wt % to saturated concentration. The reaction temperature thereof is preferably from 40 to 70° C., and more preferably from 55 to 65° C. The reaction for carbonating lithium chloride brine is a liquid-liquid reaction, and the reaction proceeds promptly. Therefore, it is not necessary to pay specific attention to contact efficiency as in the preparation of ammonium carbonate, and reaction apparatuses of various types can be used. Examples of the reaction apparatus include a reaction apparatus equipped with stirring blades and a reaction apparatus equipped with a liquid feeding pump. In this reaction, lithium carbonate is deposited as crystals, and recovered through solid-liquid separation. Therefore, various crystallizers can of course be used.

In the present invention, ammonia is recovered from the by-produced ammonium chloride aqueous solution by conducting a decomposition reaction and a stripping treatment as described above, and the ammonia is reused as a production raw material of ammonium carbonate. In the ammonia recovery, the decomposition of ammonium chloride and the stripping treatment of stripping ammonia from the decomposition residual liquid having dissolved therein ammonia formed are conducted, and mechanisms of those quite differ. For the reason above, it is preferred that the ammonia recovery apparatus has a structure in which a decomposition reaction tank is attached to the stripping tower as shown in FIG. 3, the reaction residual liquid obtained after stripping unreacted ammonia at the upper part of the tower is taken out from the central part of the tower to the decomposition reaction tank, quicklime and the like is supplied thereto to conduct a decomposition reaction of ammonium chloride, and the decomposition residual liquid having dissolved therein ammonia formed as a result of the decomposition reaction is returned to the stripping tower.

By the above procedures, stripping of unreacted ammonia in the reaction residual liquid, decomposition of ammonium chloride and stripping of ammonia formed by the decomposition are efficiently conducted in the ammonia recovery apparatus, the ammonia sequentially moves to the top of the stripping tower, an ammonia concentration is increased toward the tray of the upper part, a great part of the ammonia in the decomposition residual liquid is discharged from the top of the tower in the tray of the uppermost stage. As a result, the gas discharged from the top contains high concentration ammonia, and further contains steam and carbon dioxide gas.

In the recovery apparatus, ammonia, steam and carbon dioxide gas flow out of the top of the stripping tower as described above. The steam is condensed by a condenser, and converts to water as a liquid, and as a result, a part of the ammonia is absorbed in water formed to form ammonia water. Many remaining ammonia that was not absorbed in water by the condenser is recovered together with carbon dioxide gas, introduced in the carbon dioxide gas/ammonia gas absorption tower, and recycled.

The ammonia water formed by the condenser is returned as a reflux liquid to the recovery apparatus. A part of the ammonia water may be returned as an ammonia component to the carbon dioxide gas/ammonia gas absorption tower, and may be used for mixing with lithium chloride brine.

The reaction residual liquid containing the ammonium chloride is introduced in the recovery apparatus from the top of the stripping tower as shown in FIG. 3. This is preferred in that a countercurrent contact between the reaction residual liquid and vapor steam can be prolonged and ammonia can be efficiently subjected to stripping. The introduction of quicklime and the like is preferably conducted by taking the reaction residual liquid out from the stripping tower to the outside of the tower, introducing it in the decomposition reaction tank attached to the tower, and supplying quicklime and the like thereto. It is of course possible to directly introduce quicklime and the like in the stripping tower. Furthermore, a takeout position of the reaction residual liquid from the stripping tower is preferably the central part of the tower as described before. The embodiment in the case of introducing quicklime and the like in the recovery apparatus is preferably an embodiment that the quicklime and the like is not introduced in the form of a solid, but is introduced in a liquefied form, such as milk of lime.

Since the stripping is a process of repeatedly conducting gas-liquid contact, the structure of the stripping tower is preferably a vertically long tower structure, that is, the above-described stripping tower is preferably used. The structure can be a packed tower structure containing a filler such as inexpensive Raschig rings having excellent contact efficiency in the part in which the decomposition residual liquid containing milk of lime and the like after the decomposition of ammonium chloride is not introduced, that is, in the upper part of the tower. However, the tower structure of the part lower than the position in which the decomposition residual liquid is introduced has a concern that a solid attaches to the inside of the tower by the presence of milk of lime. Therefore, it is preferred to avoid use of the packed tower structure, and in such a case, a plate tower structure is preferably used.

For example, in the case of introducing the decomposition residual liquid having dissolved therein ammonia formed and containing milk of lime from the top of the tower, a tray structure is preferably used from the top to the bottom of the tower. On the other hand, in the case of introducing the reaction residual liquid from the central part of the tower, it is preferred that the upper part has a packed tower structure and the lower part has a plate tower structure (see FIG. 3). Particularly, the latter embodiment is preferred. The introduction of milk of lime in such a case is preferably conducted such that the liquid in the tower is taken out from the lower part of the packed tower located at the upper part of the stripping tower and guided to the decomposition reaction tank, and milk of lime is introduced therein (FIG. 3).

The stripping tower can be operated under pressure and under reduced pressure. Temperature control in the tower in the case of operating the embodiment that the reaction residual liquid containing ammonium chloride is introduced from the top of the tower and the decomposition residual liquid containing milk of lime as quicklime and the like is introduced from the central part of the tower, under reduced pressure (FIG. 3) is exemplified below. Namely, it is preferable that a supplied steam temperature is from 105 to 140° C., a liquid temperature at the lowermost tray is from 105 to 140° C., a liquid temperature at a decomposition residual liquid supplying tray is from 85 to 95° C., a liquid temperature at the uppermost tray is from 60 to 85° C., and a liquid temperature of the decomposition residual liquid at the bottom of the tower is from 70 to 90° C. The tower structure in such a case is preferably the above-described structure. Specifically, milk of lime is introduced from the central part of the tower, and as a result, there is no concern that a solid is deposited at the top of the tower. This can provide an inexpensive packed tower structure having excellent contact efficiency.

By the above-described apparatus structure and temperature control, ammonium chloride is almost completely decomposed, and ammonia dissolved can be sufficiently stripped. As a result, the overall recovery of ammonia can achieve from 99 to 99.9%. The decomposition residual liquid containing calcium chloride by-produced as a result of the decomposition remains on the bottom of the recovering apparatus. By using this decomposition residual liquid, sulfate ions present in lithium chloride brine can be deposited as calcium sulfate, and can be removed through solid-liquid separation. This procedure can reduce a concentration of sulfate radicals in lithium chloride brine. Therefore, it is preferred to use this in desulfurization of low concentration lithium chloride brine before concentration.

The second embodiment is described below by reference to FIG. 2. In this description, items different from the first items are mainly described, and the description of the common items is omitted.

Figure 2:
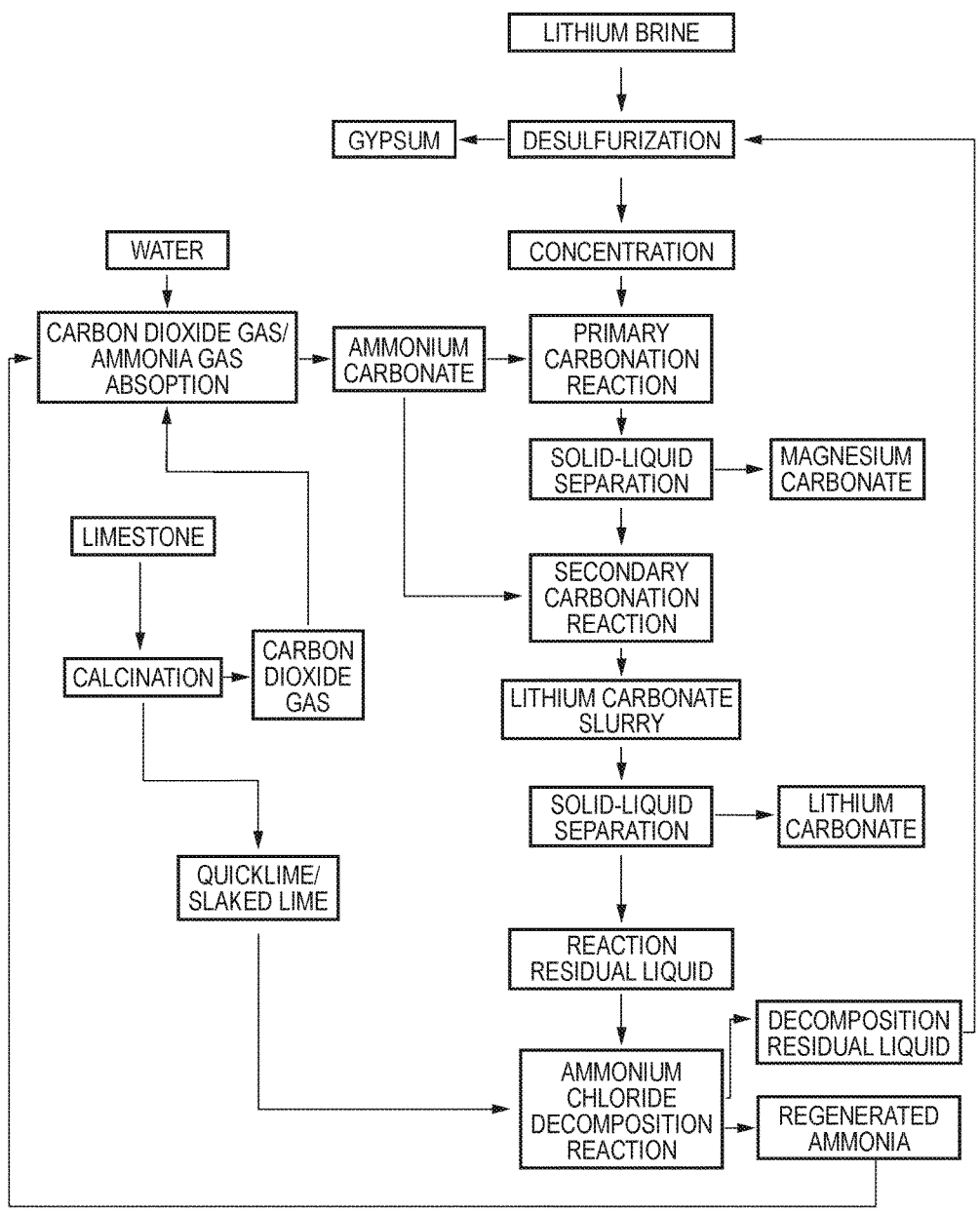
FIG. 2 is a flow chart showing a second embodiment of the present invention.

FIG. 2 is a flow chart of the second embodiment. Carbon dioxide gas and recovered ammonia (gas) are absorbed in water in the carbon dioxide gas/ammonia gas absorption tower as same as in the first embodiment, and an ammonium carbonate solution is formed. A part (small amount) divided from the ammonium carbonate solution is introduced in a primary carbonation reaction apparatus.

In the primary carbonation reaction apparatus, the ammonium carbonate solution is mixed with lithium chloride brine (concentrated brine), and reacted with a magnesium compound present in the lithium chloride brine to deposit magnesium carbonate. The deposited magnesium carbonate is separated and removed from the lithium chloride brine through solid-liquid separation. The magnesium carbonate is excellent in filtration property as compared with magnesium hydroxide. As a result, as compared with the conventional technology of separating and removing a magnesium compound as magnesium hydroxide, magnesium can be separated from lithium chloride brine in a short period of time, and lithium chloride brine from which magnesium has been efficiently removed (hereinafter referred to as "demagnesium") can be obtained. The presence of the demagnesium step is only the difference from the first embodiment.

The amount divided from the ammonium carbonate solution for introducing in the primary carbonation reaction apparatus is a small amount as described before. The divided amount is a range that a magnesium compound is deposited as magnesium carbonate and lithium chloride is not deposited as a carbonate compound. Specifically, the term "small amount" used herein means, for example, 2 to 8% of the amount of the ammonium carbonate solution used for the production of lithium carbonate. The lithium chloride brine having been subjected to demagnesium is then supplied to a secondary carbonation reaction apparatus, and is mixed with an ammonium carbonate solution remained therein to deposit lithium carbonate. The deposited lithium carbonate is recovered as a final objective substance through solid-liquid separation.

In the carbonation reaction, ammonium chloride is formed together with lithium carbonate, and is contained in the reaction residual liquid that is a liquid obtained after the solid-liquid separation. The ammonium chloride is decomposed by quicklime and the like that is a by-product in the production of carbon dioxide gas in the recovery apparatus as same as in the first embodiment, thereby generating ammonia. The ammonia is recovered as ammonia (gas) from the top of the recovery apparatus, and after recovery, is introduced in the carbon dioxide gas/ammonia gas absorption tower, and is recycled. A calcium component derived from quicklime and the like used in the decomposition of ammonium chloride remains in the decomposition residual liquid, and is preferably used in desulfurization of lithium chloride brine before concentration as same as in the first embodiment.

EXAMPLES

The present invention will be described in more detail below with reference to an example and a reference example, but the present invention is not limited to the example.

Example 1

In Example 1, an ammonium carbonate aqueous solution was prepared. The preparation thereof was conducted by using two absorption towers each having bubble cap trays, supplying water from the top and ammonia from the bottom in a first tower, supplying water having absorbed therein ammonia from the top and carbon dioxide gas from the bottom in a second tower, and continuously absorbing ammonia and carbon dioxide gas in water.

Those two towers used for the absorption, that is, the first tower and the second tower, were the same, and structure, volume and the like of those towers are as follows.

Overall structure of tower: Number of bubble cap trays: 8
Structure of tray: Tray with downcomer, equipped with one bubble cap
Whole liquid retention volume of absorption tower: 10 L
Ammonia concentration in ammonium carbonate, carbon dioxide concentration, lithium (Li) concentration of lithium chloride aqueous solution and pH, employed in producing lithium carbonate in Example 1 are shown in Table 1 below.

TABLE 1

|  | Ammonium carbonate solution | LiCl aqueous solution |
| --- | --- | --- |
| $CO_2$ content (g/L) | 231 | — |
| $NH_3$ content (g/L) | 186 | — |
| Li content (g/L) | — | 70 |
| pH | 10.21 | 5.53 |

The reason for employing the above conditions to the concentration of ammonia and carbon dioxide gas is that test was previously conducted on absorption amount of those and the maximum value in the case of efficiently absorbing are the same as described above. Specifically, regarding the respective raw material gases of ammonia and carbon dioxide gas, a liquid such as water was supplied from the top of the tower and the gas was supplied from the bottom of the tower, separately, a preliminary absorption test that continues until the respective bubbles start to overflow from the top of the tower was performed, an overflow starting point was obtained, and as a result, the respective absorption amounts were the same as in Table 1 above. Supply amount of a liquid such as water, supply amount of gas such as ammonia, reaction time, gas concentration in an absorption liquid, and the like employed in Example 1 are shown in Table 2 below.

TABLE 2

|  | $NH_3$ absorption | $CO_2$ absorption |
| --- | --- | --- |
| Liquid supply amount (L/h) | 10 | 10 |
| Gas supply amount (g/h) | 2,280 | 3,750 |
| Concentration after absorption (g/L) | 186 | 231 |
| Absorption time (h) | 0.5 | 0.5 |

The ammonium carbonate aqueous solution obtained above was reacted with lithium chloride in a reaction apparatus equipped with stirring blades, and lithium carbonate was continuously produced.

Each absorption operation time, each reaction time, amount of lithium carbonate recovered, recovery ratio of lithium, an amount of fixed matters formed, ratio by percentage of an amount of fixed matters formed to an amount of $Li_2CO_3$ recovered (simply referred to "fixed matter formation ratio" throughout the description) and the like are shown in Table 3 below. Lithium concentration in lithium chloride used in the production of lithium carbonate was 70 g/l (Li). Each operation time and each reaction time were shown in terms of retention time. The reason for this is that each operation and each reaction are continuously conducted as described above and it is reasonable to show it in terms of retention time.

TABLE 3

|  | Lithium carbonate production in Example 1 | Lithium carbonate production in Reference Example 1 |
| --- | --- | --- |
| Liquid retention volume in carbonation reaction apparatus (L) | 0.40 | 10.0 |
| LiCl aqueous solution supply amount (L/h) | 2.3 | 4.0 |
| Li concentration (g/L) | 70.0 | 40.0 |
| [Li concentration after mixing with $(NH_4)_2CO_3$] (g/L) | 26.4 | |
| Ammonium carbonate aqueous solution supply amount (L/h) | 3.8 | |
| Carbonation reaction temperature (° C.) | 50 | 60 |
| $NH_3$ absorption time (h) | 0.5 | 0.42 |
| Carbonation time (h) | | 2.5 |
| $(NH_4)_2CO_3$ formation time | 0.5 | |
| $Li_2CO_3$ formation time | 0.06 | |
| Overall time required in production of $Li_2CO_3$ (h) | 1.06 | 2.92 |
| $Li_2CO_3$ recovery amount (g/h) | 528 | 528 |
| Li recovery ratio (%) | 61.4 | 62.0 |
| Fixed matter formation amount (g/h) | 1.7 | 53.8 |
| Fixed matter formation ratio (%) | 0.32 | 10.2 |

Reference Example 1

As described above, for the sake of comparison, lithium carbonate was produced by the method described in Patent Document 3, and this is shown below as Reference Example 1. The carbonation reaction was conducted using an apparatus having different two stages. Specifically, ammonia was first absorbed in a lithium chloride aqueous solution using the same absorption tower as in Example 1 in a first stage, and carbon dioxide gas was then supplied to the lithium chloride aqueous solution having absorbed therein ammonia using a carbonation tower equipped with 10 bubble cap trays in a second stage to conduct carbonation reaction. In such a case, the lithium chloride aqueous solution was introduced in the first stage absorption tower from the top thereof, and ammonia was introduced therein from the bottom thereof. Furthermore, a lithium chloride aqueous solution having absorbed therein ammonia was introduced in the second stage carbonation tower from the top thereof, and carbon dioxide gas was introduced therein from the bottom thereof.

Production conditions employed in Reference Example 1, that is, a liquid supply amount, a gas supply amount, a reaction time (retention time) and the like employed in the first stage and the second stage are shown in Table 4 below. The test results of Reference Example 1 are shown in Table 3 together with the results of Example 1. Specifically, Table 3 showed a reaction time, a recovery amount of lithium carbonate ($Li_2CO_3$), a recovery ratio of lithium, an amount of fixed matters formed, a fixed matter formation ratio, and the like. Table 3 further showed reaction conditions, operation conditions and the like of Reference Example 1. In this comparative experiment, to facilitate the comparison between the results of Example 1 and the results of Reference Example 1, reaction conditions and the like were selected such that the recovery amount of lithium carbonate ($Li_2CO_3$) and the recovery ratio of lithium are almost the same between those.

TABLE 4

|  | $NH_3$ absorption | Carbonation reaction |
| --- | --- | --- |
| Liquid supply amount (L/h) | 24 | 4.0 |
| Gas supply amount (g/h) | 2960 | 507 |
| Concentration after absorption (g/L) | 101 | — |
| Retention (required) time (h) | 0.42 | 2.5 |

The results of the comparative experiment are shown in Table 3 as described above, and the reaction conditions are selected in the comparative experiment such that the recovery amount of lithium carbonate ($Li_2CO_3$) and the recovery ratio of lithium are almost the same between the example and the reference example as described above. Specifically, the production experiments of lithium carbonate were carried out under the conditions such that the recovery amount of lithium carbonate was 528 g/h in both Example 1 and Reference Example 1, and the recovery ratio of lithium was about 62%.

It is understood from the results of experiments that lithium carbonate can be produced in a short period of time in the production method of lithium carbonate by Example 1, as compared with Reference Example 1 based on the description of Patent Document 3.

Specifically, the time required for the production of lithium carbonate in Example 1 is the total reaction of both steps of a step of producing ammonium carbonate and a step of producing lithium carbonate using the same ("overall time required in production of $Li_2CO_3$" in Table 3), and is 1.06 h. On the other hand, the overall time required in the production of $Li_2CO_3$ in Reference Example 1 is 2.92 h.

Thus, the time required for the production of lithium carbonate is about 1 hour in Example 1, whereas the time is about 3 hours in Reference Example 1. It is apparent that Example 1 can produce lithium carbonate in the time of ⅓ of the time in Reference Example 1. Therefore, it is understood that the present invention is very excellent in production efficiency.

Furthermore, the formation amount of fixed matters and the formation ratio thereof in Example 1 are extremely low as compared with those of Reference Example 1. Therefore, removal operation of fixed matters as required in Reference Example 1 based on Patent Document 3 is not substantially required in Example 1, and maintenance property and production efficiency are excellent. It is understood that Example 1 is excellent in this point. Specifically, the formation amount of fixed matters and the formation ratio thereof in Example 1 are 1.7 g/h and 0.32%, respectively, whereas those in Reference Example 1 are 53.8 g/h and 10.2%, respectively. Thus, the formation amount of fixed matters and the formation ratio thereof in Reference Example 1 are about 30 times those of Example 1, and the present invention is excellent in this point. Additionally, in Example 1, the carbonation reaction apparatus in which fixed matters are formed does not have a complicated structure equipped with 8-stage bubble trays or 10-stage bubble trays as the absorption tower used in Example 1 and the carbonation reaction tower used in Reference Example 1, and has a simple structure equipped with stirring blades in a cylindrical vessel. Therefore, even if the case occurs that the removal of fixed matters is required, the removal is simple.

In the present invention, specifically Example 1, the lithium carbonate production step is separated into gas-liquid reaction and liquid-liquid reaction, in contrast to Reference Example 1, and this makes it possible to employ liquid-liquid reaction in the formation reaction of lithium carbonate in the latter stage. As a result, the formation reaction of lithium carbonate smoothly proceeds, the time required in the production can be shortened, and production efficiency can be improved.

Furthermore, since the first stage formation reaction of ammonium carbonate in the former stage is conducted in the absence of lithium chloride, the reaction smoothly proceeds as compared to the case of Patent Document 3 in which three materials are simultaneously reacted, and it is possible to produce high concentration ammonium carbonate in a short period of time.

The present application is based on Japanese Patent Application No. 2015-209453 filed on Oct. 26, 2015, and the contents are incorporated herein by reference.

What is claimed is:

1. A method for producing lithium carbonate, the method comprising:
    mixing water, ammonia and carbon dioxide gas to form an ammonium carbonate aqueous solution;
    mixing lithium chloride brine with the ammonium carbonate aqueous solution to conduct a carbonation reaction; and
    recovering a solid formed after the carbonation reaction through solid-liquid separation,
    wherein, as the carbon dioxide gas, carbon dioxide gas produced by thermally decomposing limestone is used, and
    as the ammonia, regenerated ammonia obtained by reacting ammonium chloride by-produced during the carbonation reaction with quicklime by-produced during the production of the carbon dioxide gas or slaked lime obtained by hydrating the quicklime is used.

2. A method for producing lithium carbonate, the method comprising:
    mixing water, ammonia and carbon dioxide gas to form an ammonium carbonate aqueous solution;
    mixing a part divided from the ammonium carbonate aqueous solution with lithium chloride brine to conduct a primary carbonation reaction, thereby depositing magnesium carbonate, followed by conducting solid-liquid separation;
    mixing the residual ammonium carbonate aqueous solution with liquid obtained after the solid-liquid separation to conduct a secondary carbonation reaction; and
    recovering a solid formed after the carbonation reaction through solid-liquid separation,
    wherein, as the carbon dioxide gas, carbon dioxide gas produced by thermally decomposing limestone is used, and
    as the ammonia, regenerated ammonia obtained by reacting ammonium chloride by-produced during the carbonation reaction with quicklime by-produced during the production of the carbon dioxide gas or slaked lime obtained by hydrating the quicklime is used.

3. The method for producing lithium carbonate according to claim 1, wherein the reaction for forming the ammonium carbonate aqueous solution by mixing water, ammonia and carbon dioxide gas is conducted using a vertically long absorption tower equipped with a member for improving gas-liquid contact efficiency in an inside thereof, in which water was supplied from a top of the absorption tower, and ammonia and carbon dioxide gas are supplied from a bottom of the absorption tower.

4. The method for producing lithium carbonate according to claim 1, wherein the regenerated ammonia is obtained using an ammonia recovery apparatus comprising a vertically long stripping tower equipped with a member for improving gas-liquid contact efficiency in an inside thereof and a decomposition reaction tank for taking out an ammonium chloride-containing reaction residual liquid in the stripping tower and conducting decomposition reaction of ammonium chloride, in which the reaction residual liquid is supplied to a top of the stripping tower, the reaction residual liquid is taken out from a central part of the stripping tower, ammonium chloride is decomposed in the decomposition reaction tank, a decomposition residual liquid having dissolved therein ammonia formed is returned to the central part of the stripping tower, steam is supplied to a bottom of the stripping tower, simultaneously regenerated ammonia is recovered from the top of the stripping tower, and a residual liquid containing a calcium component is discharged from the bottom of the stripping tower.

5. The method for producing lithium carbonate according to claim 2, wherein the reaction for forming the ammonium carbonate aqueous solution by mixing water, ammonia and carbon dioxide gas is conducted using a vertically long absorption tower equipped with a member for improving gas-liquid contact efficiency in an inside thereof, in which water was supplied from a top of the absorption tower, and ammonia and carbon dioxide gas are supplied from a bottom of the absorption tower.

6. The method for producing lithium carbonate according to claim 2, wherein the regenerated ammonia is obtained using an ammonia recovery apparatus comprising a vertically long stripping tower equipped with a member for improving gas-liquid contact efficiency in an inside thereof and a decomposition reaction tank for taking out an ammonium chloride-containing reaction residual liquid in the stripping tower and conducting decomposition reaction of ammonium chloride, in which the reaction residual liquid is supplied to a top of the stripping tower, the reaction residual liquid is taken out from a central part of the stripping tower, ammonium chloride is decomposed in the decomposition reaction tank, a decomposition residual liquid having dissolved therein ammonia formed is returned to the central part of the stripping tower, steam is supplied to a bottom of the stripping tower, simultaneously regenerated ammonia is recovered from the top of the stripping tower, and a residual liquid containing a calcium component is discharged from the bottom of the stripping tower.

* * * * *